(12) United States Patent
Baulier

(10) Patent No.: US 6,505,726 B1
(45) Date of Patent: Jan. 14, 2003

(54) SOFT TOUCH LIFTER

(75) Inventor: Dominique Baulier, Windsor (CA)

(73) Assignee: Valiant Corporation (CA)

( * ) Notice: Subject to any disclaimer, the term of this patent is extended or adjusted under 35 U.S.C. 154(b) by 33 days.

(21) Appl. No.: 09/895,901

(22) Filed: Jun. 29, 2001

(51) Int. Cl.$^7$ ................................................ B65G 35/00
(52) U.S. Cl. ................................ 198/345.1; 198/343.2; 198/468.8
(58) Field of Search .......................... 198/345.1, 343.2, 198/345.2, 345.3, 346.3, 468.01, 468.8; 29/897.2, 561, 564, 281.4

(56) References Cited

U.S. PATENT DOCUMENTS

| | | | | |
|---|---|---|---|---|
| 4,924,996 A | * | 5/1990 | Svensson et al. | 198/341 |
| 4,928,386 A | * | 5/1990 | Schupp et al. | 29/824 |
| 4,946,089 A | * | 8/1990 | Baulier et al. | 228/45 |
| 5,011,068 A | * | 4/1991 | Stoutenburg et al. | 228/49.1 |
| 5,027,502 A | * | 7/1991 | Sakamoto et al. | 29/783 |
| 5,069,326 A | * | 12/1991 | Sakamoto et al. | 198/619 |
| 5,107,577 A | * | 4/1992 | Jackson et al. | 29/281.4 |
| 5,191,958 A | * | 3/1993 | Tolocko | 198/345.1 |
| 5,313,695 A | * | 5/1994 | Negre et al. | 198/345.3 |
| 5,348,142 A | * | 9/1994 | Nishimura et al. | 198/803.11 |
| 5,873,165 A | * | 2/1999 | Bode et al. | 198/465.1 |
| 5,943,768 A | * | 8/1999 | Ray | 29/822 |
| 6,065,199 A | * | 5/2000 | Bossotto et al. | 198/345 |
| 6,109,424 A | * | 8/2000 | Doan | 198/468.8 |
| 6,155,402 A | * | 12/2000 | Murphy | 198/346.2 |
| 6,196,372 B1 | * | 3/2001 | Rossi | 198/345.1 |
| 6,427,321 B2 | * | 8/2002 | Fedato et al. | 29/787 |
| 6,439,371 B1 | * | 8/2002 | Baulier | 198/468.2 |

* cited by examiner

Primary Examiner—Douglas Hess
(74) Attorney, Agent, or Firm—Gifford, Krass, Groh, Sprinkle, Anderson & Citkowski, P.C.

(57) ABSTRACT

A "soft touch" lifter for an automotive "Body in White" geometry station like a framing system is disclosed having a unique lifting assembly for elevating both the automotive body and the underbody tooling to a geometry position. The system includes a lift assembly which is vertically slidably mounted to a stationary base and movable between a first position in which the lift frame is positioned beneath a skid positioned at the geometry station and upon which the automotive body is supported, and a second position elevated from the first position. An underbody tooling assembly is mounted to the lift frame, and this tooling assembly includes a plurality of locators which register with position receptors on the automotive underbody when the skid is positioned at the geometry station.

8 Claims, 7 Drawing Sheets

SOFT TOUCH LIFTER

BACKGROUND OF THE INVENTION

I. Field of the Invention

The present invention relates generally to a "soft touch" lifter for automotive Body in White geometry stations like framing stations.

II. Description of Related Art

In automotive Body in White geometry stations, automotive bodies in which the automotive body components have not been initially fixedly secured together, typically by welding, are supported on a skid. The skid, in turn, is moved by a conveyor system such as a roller table or belt conveyor along the conveyor line.

In order to form the final geometry and secure the automotive body components together, the skid together with the automotive body components supported by the skid is moved to a geometry station. Automotive tooling is provided at the geometry station, and a part of the tooling is initially positioned beneath the skid as the skid is moved into this geometry station. This underbody tooling typically includes a plurality of locators which register with receptors, such as locating holes, and N.C. blocks and clamps unit locating the outer surface of the body component.

The underbody tooling is generally movable at the geometry station between a lower and an upper position. In its upper position, the locators engage the receptors in the automotive underbody components and slightly elevate the automotive body components upwardly from the skid to the geometry position. Since the position of the tooling locators is fixed relative to the receptors, the tooling accurately positions the automotive body components relative to each other at the geometry position. With the automotive body components accurately positioned relative to each other, the body components are secured together by any conventional means, such as welding, clinching, or the like.

One disadvantage of these previously known lifter for automotive Body in White geometry systems is that the cycle time for elevating the automotive body components above the skid and to the final geometry position by the machine tools is rather prolonged thus increasing the overall cycle time of the automotive production line. This protracted time to first engage the underbody tooling, then to elevate the automotive body components to the geometry position in contact with upper tooling, since the tooling used to elevate the body components to the assembly position must undergo a double acceleration/deceleration cycle.

More specifically, with the skid positioned at the geometry station, the underbody tooling is first accelerated from a position largely beneath the skid and towards the automotive body components to deeply engage tooling into underbody cavities. In order to prevent damage to the automotive body components which would otherwise be caused by a rapid impact of the tooling against the body components, the tooling must be decelerated prior to contacting the body components so that only a "soft" impact occurs between the tooling and the body components.

Following the soft impact of the tooling against the body components, the tooling is again reaccelerated thus elevating the body components up to the contact of the upper tooling, creating at the end of the stroke a slight clearance between the body and skid.

Such acceleration, deceleration, reacceleration and final deceleration of the tooling, even if performed by a CAME system or an epicycloidal gear box, appreciably increases the overall cycle time for the framing system. This is particularly true, since the underbody tooling together with its movable support frame typically weighs several thousand pounds.

BRIEF DESCRIPTION OF THE PRESENT INVENTION

The present invention provides a "soft touch" lifter for an automotive Body in White geometry station which overcomes all of the above-mentioned disadvantages of the previously known devices.

In brief, as in the previously known devices, the automotive body components are supported by a skid prior to welding of the body components together. The skid itself is conveyed by any conventional conveyor system, such as a roller conveyor system, such that the skid together with its supported body components are introduced in a geometry station having a stationary base.

A pair of lift frames is vertically slidably mounted to the base at the geometry station so that the lift frame is movable between a first position and a second position. At its first position, the lift frame is largely positioned beneath the skid at the assembly station while, conversely, in its second position, the lift frame is moved to an elevated position relative to its first position.

Conventional underbody tooling is secured to the lift frame so that the underbody tooling moves in unison with the lift frame. Such tooling typically includes a plurality of locators which register with receptors, typically locating holes formed in the body components. Thus, as the locators engage their corresponding receptors and elevate the body components toward the upper tooling, and slightly away from the skid, the set of tooling precisely locates the body components relative to each other. The body components are then secured together in any conventional fashion, such as by welding.

Unlike the previously known lifters for geometry stations like framing systems, however, the lifter system of the present invention includes a pair of lift arms with one lift arm being vertically slidably mounted to the base frame at each end of the lift frame. These lift arms are thus movable between a lower position and an upper position. Furthermore, the lift arms register with the skid so that, as the lift arms are moved from their lower and to their upper position, the lift arms engage and elevate the skid together with the body components supported on the skid.

In the preferred embodiment of the invention, an elongated belt drivingly connects each lift arm with the lift frame. These elongated belts ensure that the lift arms move in synchronism with the lift frame. Just as importantly, however, is that the elongated belts move the lift arms from their lower and to their upper position at a speed one-half the speed of movement of the lift frame from its first and to its second position. Furthermore, as the lift frame approaches its second position and the lift arms simultaneously approach their upper position, the underbody tooling finally engages the automotive underbody and slightly elevates the automotive body components up from the skid at the very end of the upward stroke or upward movement of the lift arm and the lift frame.

Since the lift arms simultaneously move the skid in an upward direction prior to impact of the underbody tooling upon the automotive body components at the end of the stroke, the speed of impact of the tooling against the automotive body components is effectively reduced by the upward speed of the lift arms and thus of the skid. Consequently, unlike the previously known framing systems, the present system eliminates the need to decelerate the tooling in the middle of its stroke prior to impact against the automotive body components.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
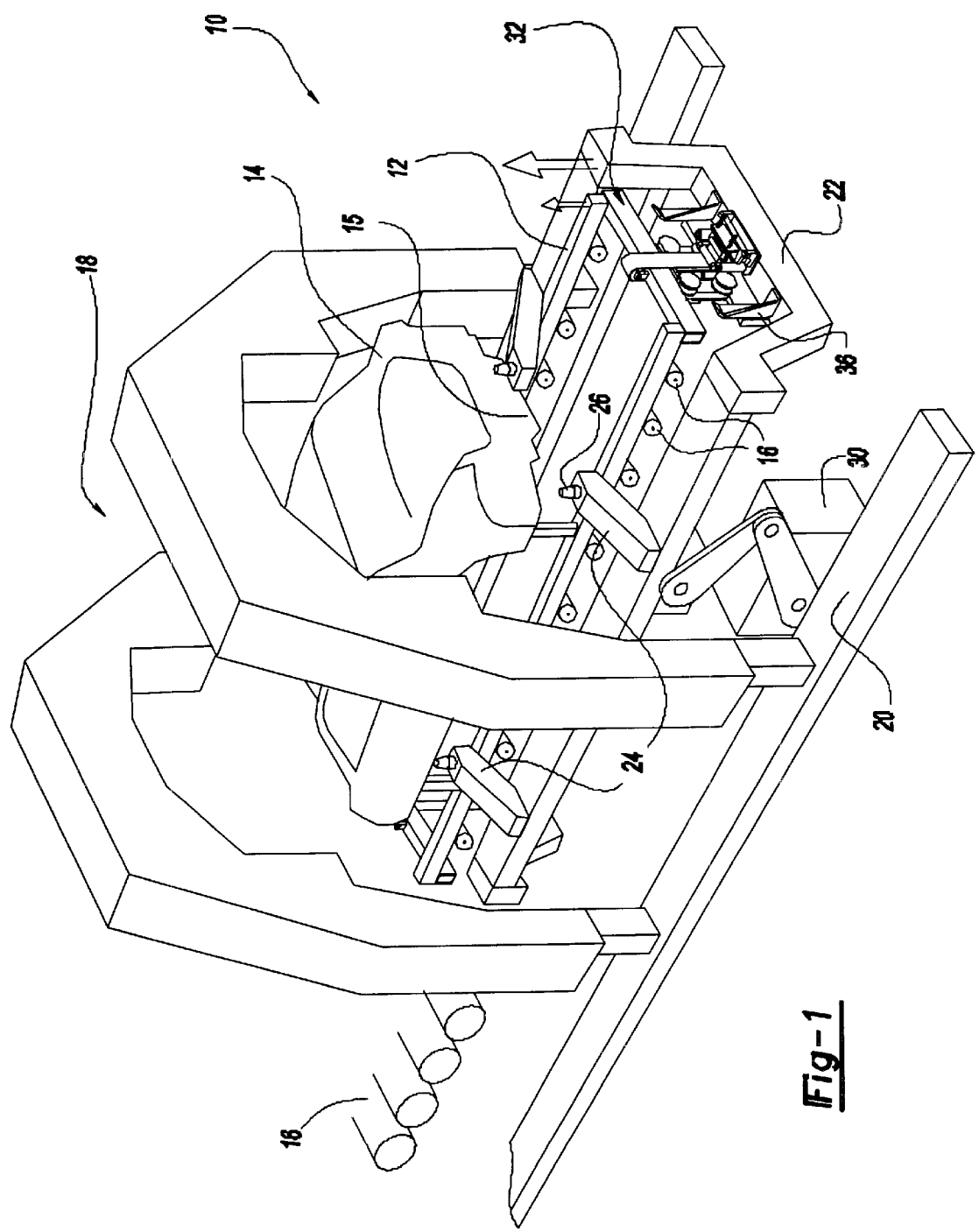
FIG. 1 is an elevational view illustrating a preferred embodiment of the present invention installed inside of an automotive body framing station.

With reference first to FIG. 1, an elevational view of an automotive framing system 10 including a soft touch lifter of the present invention is illustrated. In the conventional fashion, a skid 12 supports two or more automotive body components 14, 15 which are either not attached together or only loosely attached together. These automotive body components 14, 15 are supported on the upper surface of the skid 12. The skid 12, together with its supported body components 14, 15, is transported by any conventional means, such as a roller conveyor system 16 (illustrated diagrammatically) to a geometry station 18.

Figure 6:
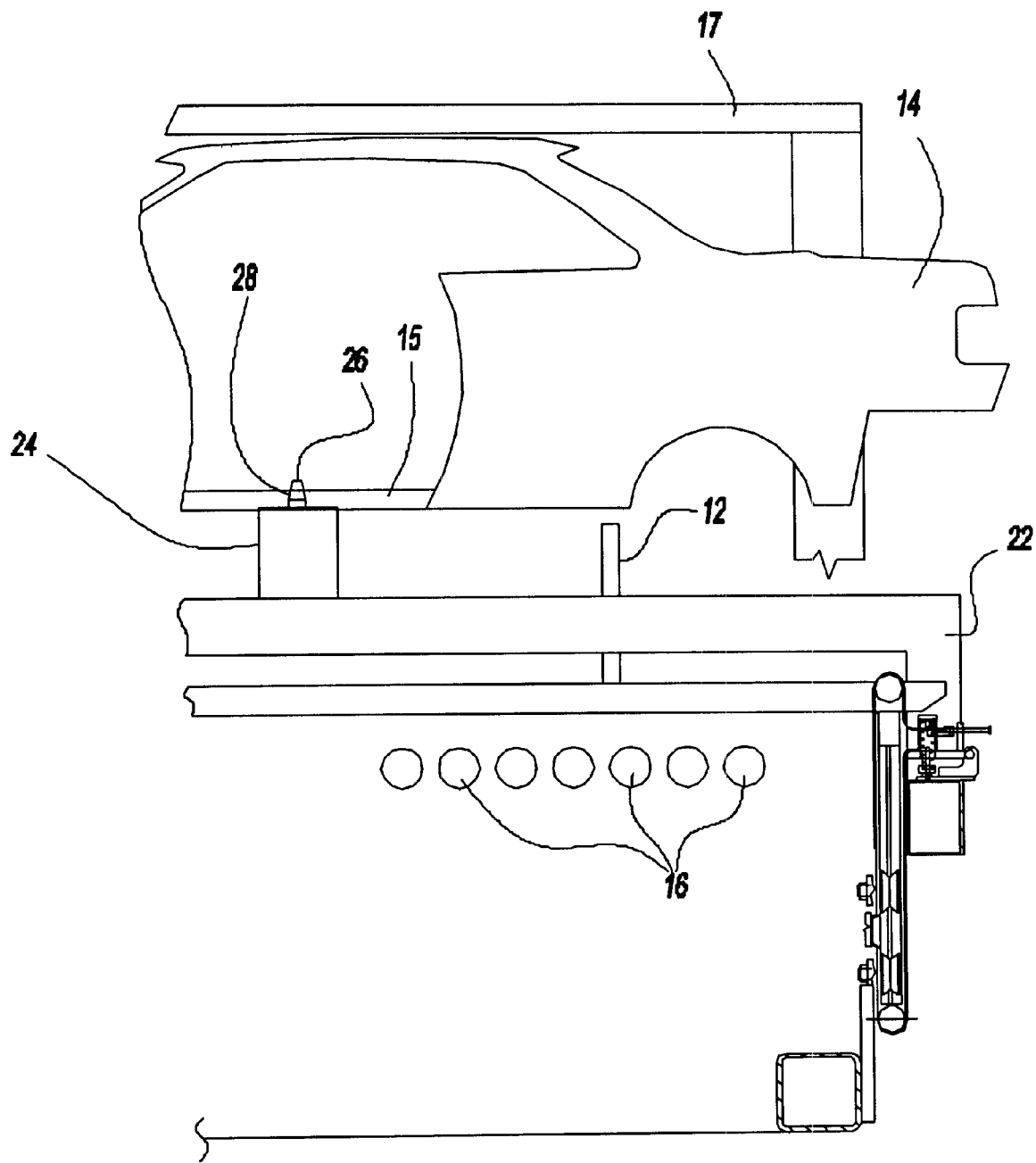

With reference now to FIGS. 1, 2 and 4–6, the geometry station 18 includes a base 20 which is fixed relative to a ground support surface. A lift frame 22 is vertically slidably mounted to the base 20 and movable between a lower position, illustrated in FIGS. 1, 2 and 4, and an upper position, illustrated in FIG. 6. In the conventional fashion, an automotive underbody tooling assembly 24 is secured to the lift frame 22 so that the underbody tooling 24 moves in unison with the lift frame 22. The tooling 24 includes a plurality of locators 26 (FIGS. 1, 2 and 6) which register with receptors 28 (illustrated only diagrammatically in FIGS. 2 and 6) in the automotive body components 14. These receptors 28 typically comprise locating holes formed in the automotive body components 14. Consequently, with the tooling locators 26 positioned within their associated receptors 28 on the automotive body components 14 as shown in FIG. 6, the automotive underbody 15 is precisely positioned. With the automotive underbody 15 thus positioned, the other body components 14 will be located by upper tooling 17 before being secured together in any conventional fashion, such as by welding.

Figure 2:
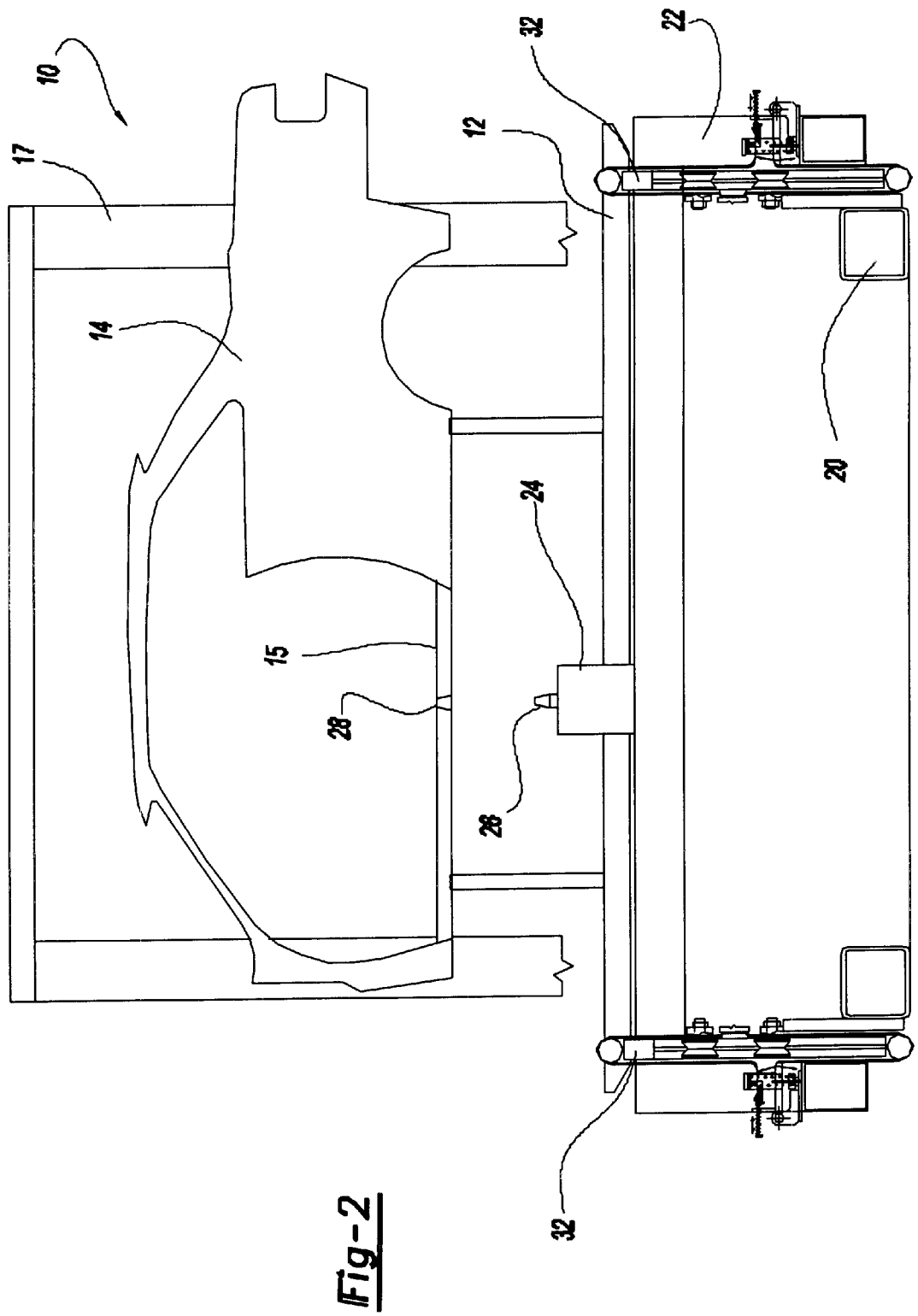
FIG. 2 is a side view illustrating the preferred embodiment of the present invention installed inside of an automotive body framing station.

Referring to FIGS. 1 and 2, with the lift frame 22 positioned in a first or lower position, both the lift frame 22 and tooling 24 is positioned beneath the skid 12 when the skid 12 is introduced in the geometry station 18. The lift frame 22 is vertically slidably mounted to the base 20 and movable to a second elevated position (FIG. 6) in which the tooling 24 engages the underbody components 15 in the previously described fashion thus supporting the body components 14 at an assembly position illustrated in FIG. 6. Any conventional means, such as hydraulic actuators, electric actuators, or the like 30 are used to move the lift frame 22 from its first position (FIG. 1) and to its second position (FIG. 6).

Figure 3:
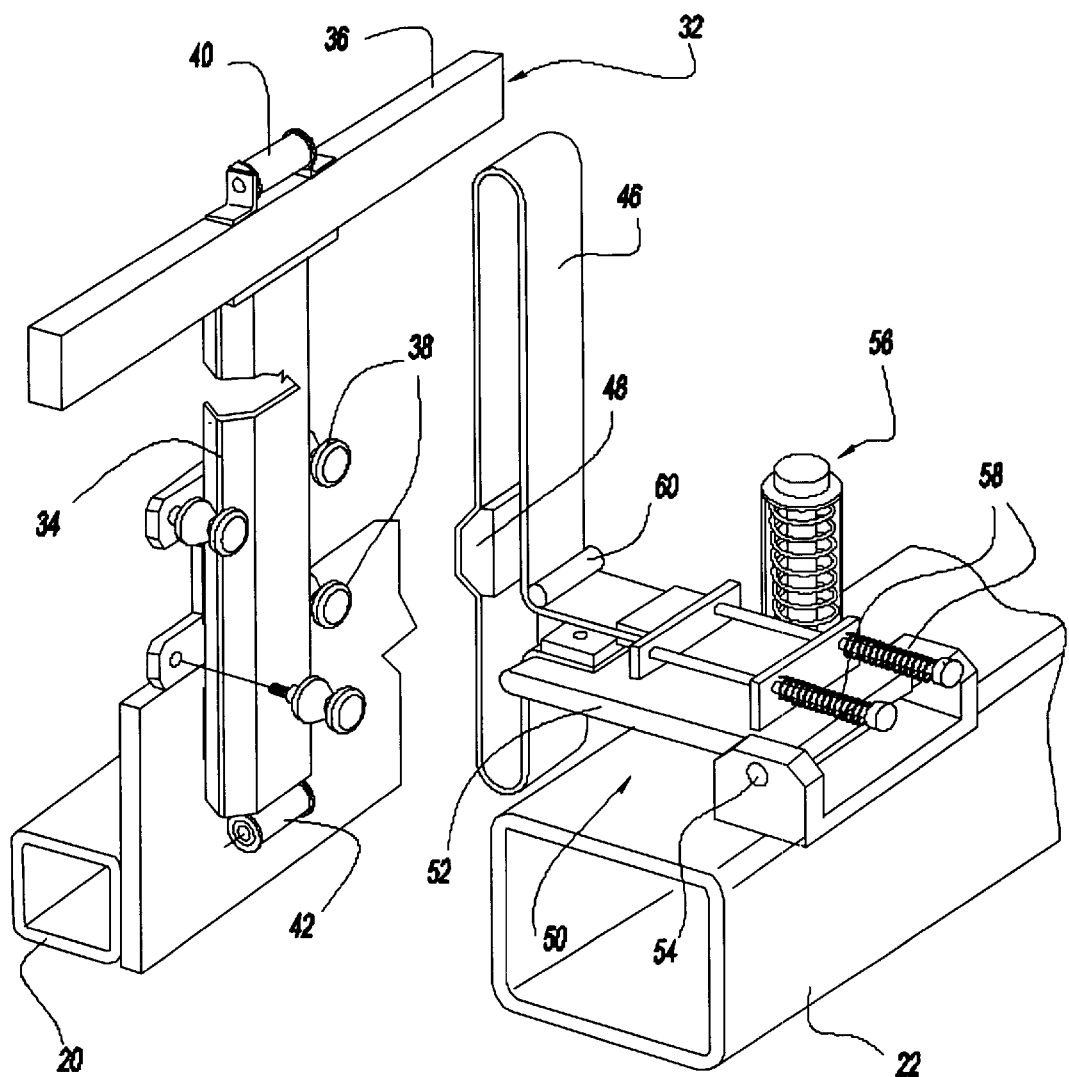
FIG. 3 is an exploded fragmentary view illustrating the lifting arm assembly of the present invention with its belt actuator shown separately.

With reference now to FIGS. 2 and 3, a pair of lift arms 32 are supported by the base 20 so that the lift arms are positioned at opposite ends of the assembly station 18 (see FIG. 2). Each lift arm 32 is generally T-shaped thus having a vertical leg 34 and an upper crossbeam 36.

Figures 4, 5:
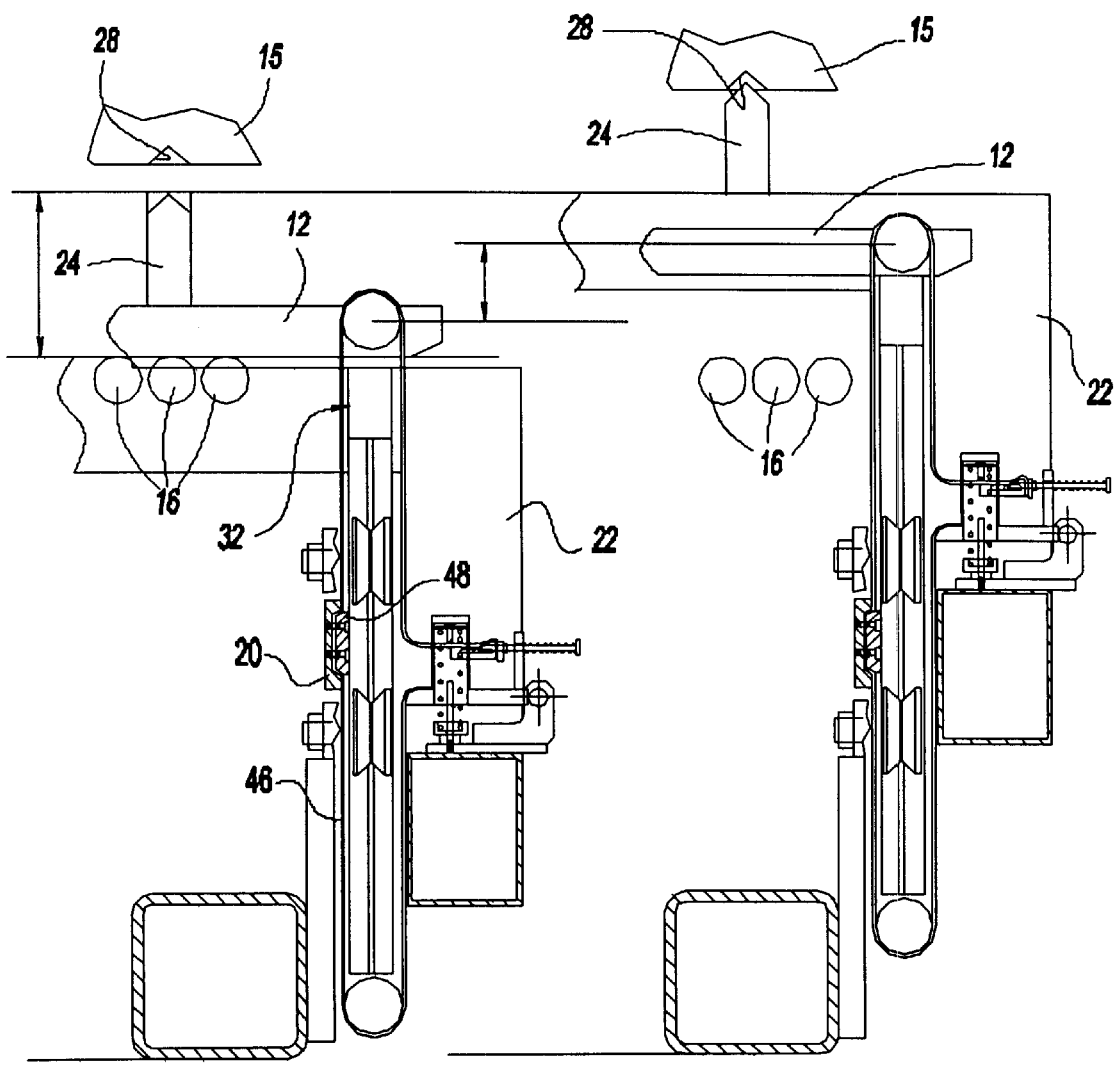
FIGS. 4–6 are fragmentary side views illustrating the operation of the preferred embodiment of the present invention shown in retracted (down) and extended (up) positions.

The lift arms 32 are vertically slidably mounted to the base 20 and movable between a lower position, illustrated in FIG. 4, and an upper position, illustrated in FIG. 6 via an intermediate situation illustrated in FIG. 5. Although any conventional means may be used to vertically slidably mount the lift arms 32 to the base 20, in the preferred embodiment a plurality of "Ve Rollers" 38 are rotatably mounted to the base 20 and engage opposite sides of the vertical leg 34 of the lift arm 32.

Figure 7:
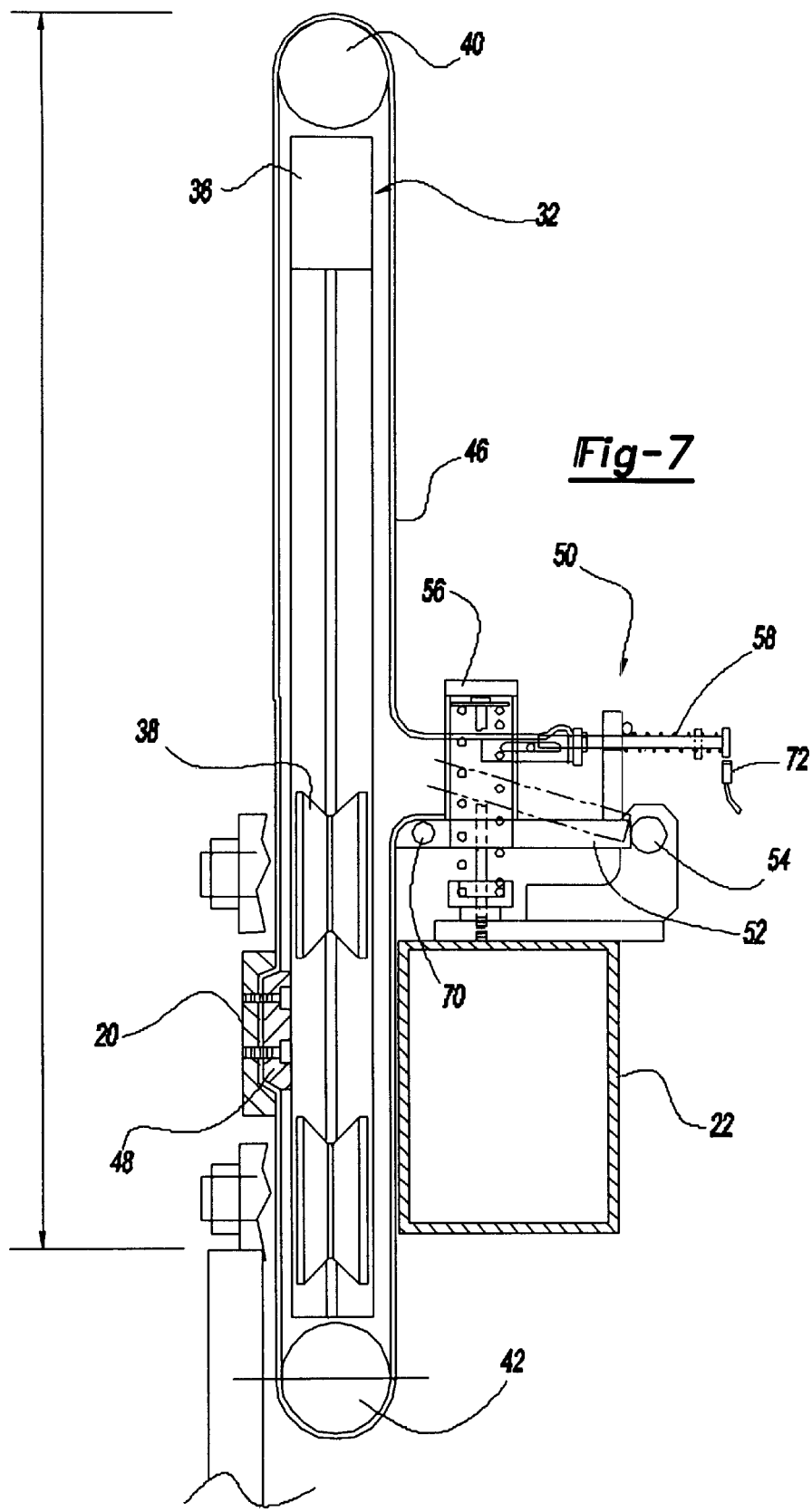
FIGS. 7 and 8 are side views of the lifting arm assemblies illustrated in different operational positions and incidental event situations.
Figure 8:
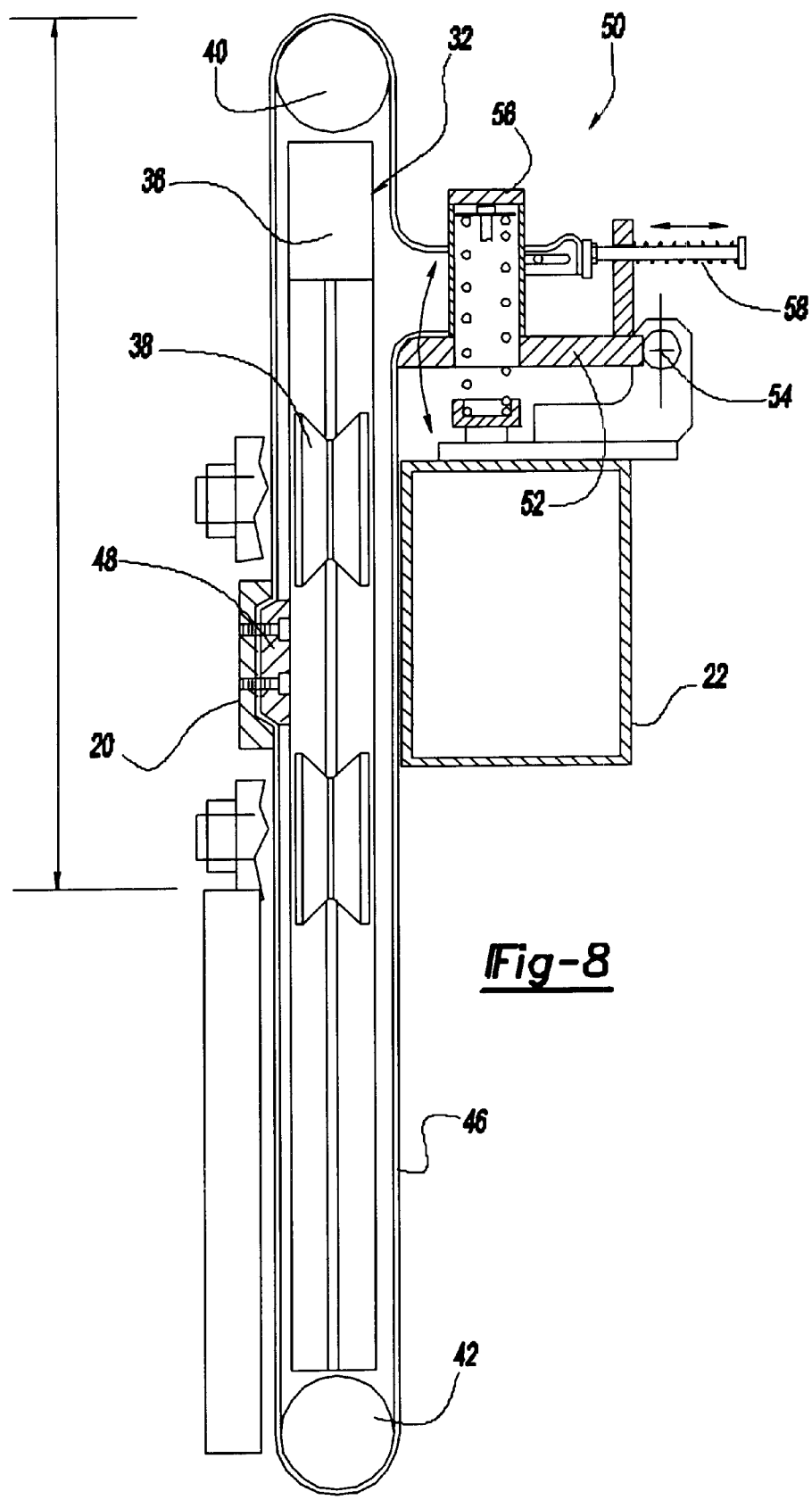

Still referring to FIGS. 3, 7 and 8, in order to move the lift arm 32 between its lower and upper positions, a first roller 40 is rotatably secured to the top of the lift arm 32 while, similarly, a second roller 42 is rotatably secured to the bottom of the vertical leg 34. The rollers 40 and 42 are preferably aligned with the center leg 34.

An elongated belt 46 is disposed around the rollers 40 and 42 and a mid-portion of the belt 46 is secured to the base 20 by a retaining block 48. The retaining block 48 thus fixes a mid-portion of the belt 46 against vertical movement relative to the base.

The free ends of the belt 46 are secured to the lift frame 22 through a retainer assembly 50. The retainer assembly 50 preferably comprises a pivot plate 52 which is pivotally mounted to the lift frame 22 by a pivot bar 54. A pair of spring retainers 56 (only one illustrated) urge the plate 52 up to the position shown in FIG. 7 while a pair of tensioning springs 58 provide longitudinal tensioning on the upper loop of the belt 46. The belt 46, however, is wrapped around a stationary roller 60 mounted to the pivot plate 52 so that, during normal operation of the lift arm 32, the overall length of the band 46, i.e. the length from the retainer assembly 50 and around both the top and the bottom of the lift arm 32, is generally fixed. Furthermore, the longitudinal length of the band 46 from the retainer assembly 50 and around the top roller 40 to the retaining block 48 is substantially the same as the longitudinal length of the belt 46 from the retainer assembly 50, around the bottom roller 42 and to the retaining block 48.

With reference now to FIGS. 7 and 8, the band 46 together with the retaining block 48 and retainer assembly 50 drivingly connects the lift arm 32 and lift frame 22 together so that both the lift frame 22 and lift arms 32 move in synchronism with each other. However, the vertical speed of the lift arm 32 is one-half the vertical speed of the lift frame 22.

With reference now to FIGS. 4–6, the operation of the system of the present invention will now be described. With the skid 12 supporting its automotive body components 14, 15 positioned at the assembly station 18, the opposite ends of the horizontal supports 36 of the lift arms 32 are positioned beneath the skid 12 as shown in FIG. 4. Consequently, one lift arm 32 is aligned with the front end of the skid 12 while the other lift arm 32 is aligned with the rear end of the skid 12.

As the lift frame 22 begins to move from its first and to its second position as shown in FIG. 5, the lift arms 32 engage the skid 12 and move the skid 12 upward together with its supported body components 14, 15 in unison with the upward movement of the lift frame 22 with its tooling 24. However, as previously described, the upward speed and stroke of the lift arms 32 is onehalf the speed and stroke of upward movement of the lift frame 22.

The lift arms 32 are movable from a lower position (FIG. 4) to an upper position (FIG. 6) in synchronism with the movement of the lift frame 22 from its lower position (FIG. 4) to its second or upper position (FIG. 6). Furthermore, as both the lift arms 32 and lift frame 22 near their intermediate position as shown in FIG. 5, the tooling 24 starts to engage the underbody 15. Consequently, as the lift frame 22 attains its second position and the lift arms 32 attain their uppermost position (FIG. 6), the tooling 24 not only engages the underbody 15 but elevates the body components 14, 15 above the skid 12 thus accurately positioning the underbody 15 in preparation for accurate positioning of the other body components 14 by the upper tooling 17, prior to securement of the body components to each other. After the body components are secured together, typically by welding, the lift frame is returned to its first or lower position thus automatically moving the lift arms 32 to their lower position and returning not only the automotive body components 14, 15 to the skid 12, but the skid 12 to the roller conveyor system 16. The skid 12 with the now assembled body components 14, 15 is transported by the conveyor 16 for further processing while a new skid 12 supporting its unattached body components is moved into the assembly station 18 where the above process is repeated.

An important advantage of the present invention is that, since the skid is elevated from its lower and to its upper position at one half the speed and stroke of the lift frame 22 containing the tooling 24, the speed of impact of the tooling 24 against the underbody 15 is effectively reduced by the upward speed of the lift arms 32, and because the impact occurs also at the end of the stroke rather than at the middle. This, in turn, eliminates the previously known necessity of decelerating the lift frame in the middle of its stroke prior to the impact of the tooling against the underbody components 14. By eliminating the previously known necessity of decelerating the lift frame prior to impact of the tooling against the underbody 15, the cycle time of the framing station of the present invention is effectively reduced.

With reference again to FIG. 7, in the event of a malfunction or jam of the framing system, the synchronism between the lifting arms 32 and lift frame 22 may be disrupted. Such disrupting can occur on either the upward or downward stroke of the lift frame 22 and lift arm 32.

When the disruption between the synchronous movement of the lift frame 22 and lift arm 32 occurs on the upward stroke of the lift frame 22 and lift arm 32, i.e. the lift arm 32 is maintained stationary despite upward movement of the lift frame 22, this relative movement will cause the plate 52 of the retainer assembly 50 to pivot downward as shown in phantom line in FIG. 7 against the force of the spring retainer 56. A sensor 70 (illustrated diagrammatically) detects this pivotal action of the retainer plate 52 and generates an output signal to disable or deactivate the system 10 thus preventing damage to the automotive component 14 as well as the system 10.

Conversely, if a malfunction occurs during the downward stroke of the lift frame 22 and lift arm 32 such that the lift arm 32 is maintained stationary despite the continued downward movement of the lift frame 22, the upper loop of belt 46 will be effectively elongated thus causing compression of the belt tensioning springs 58 as shown in phantom line. When this occurs, a further sensor 72 (illustrated diagrammatically) detects the compression of the springs 58 and again generates an output signal to deactivate or shut down the system.

From the foregoing, it can be seen that the present invention provides a novel lift assembly for an automotive framing system which is not only simple in construction, but effective in use. A primary advantage of the present invention is that it reduces the overall cycle time for the geometry station like a framing station.

Having described my invention, however, many modifications thereto will become apparent to those skilled in the art to which it pertains without deviation from the spirit of the invention as defined by the scope of the appended claims.

I claim:

1. For use in conjunction with a skid which supports an automotive body and a conveyor which transports the skid to an assembly station, a lift assembly for elevating the automotive body at the assembly station to an assembly position comprising:

a base, a lift frame vertically slidably mounted to said base at the assembly station and movable between a first position in which said lift frame is positionable beneath the skid positioned at the assembly station, and a second position elevated from said first position, a tooling assembly mounted to said lift frame, said tooling assembly having a plurality of locators for registering with position receptors on the automotive body when the skid is positioned at the assembly station, a pair of lift arms, said lift arms being vertically slidably mounted to said base adjacent opposite ends of the assembly station and movable between a lower position in which the lift arms are positionable beneath the skid when positioned in said assembly station and an upper position, each lift arm having a portion for registering with the skid, means for moving at a first speed said lift frame from said first position to said second position, means for moving at a second speed said lift arms from said lower position to said upper position in synchronism with said lift frame as said lift frame moves from said first position to said second position, wherein said second speed is slower than said first speed, and wherein with said lift frame in said second position and said lift arms in said upper position, said locators are capable of engaging said receptors and elevating the automotive body from the skid.

2. The invention as defined in claim 1 wherein each said lift arm is T-shaped thus having a vertical base and a horizontal upper cross support, and means for slidably mounting the vertical base of each lift arm to said base frame.

3. The invention as defined in claim 1 wherein said means for vertically slidably mounting said lift arms to said base frame comprises at least two rollers rotatably mounted to said base, said rollers mechanically engaging opposite sides of the lift arms.

4. The invention as defined in claim 2 wherein said means for moving said lift arms comprises:

an elongated belt having two ends, said belt being disposed around a top and a bottom of said lift arm, said belt having a mid-point secured against movement to the base, and said ends of said belt being secured to said lift frame.

5. The invention as defined in claim 4 and comprising at least one tension spring which longitudinally tensions an upper loop of said belt.

6. The invention as defined in claim 5 and comprising a sensor which detects movement of said tension spring.

7. The invention as defined in claim 4 and comprising a mounting assembly which secures said ends of said belt to said lift frame, said mounting assembly comprising a plate pivotally mounted to said lift frame about a horizontal axis, said plate being pivotal between a first position and a second position and a spring which resilienty urges said plate toward said first position.

8. The invention as defined in claim 7 and comprising a sensor which detects movement of said mounting assembly plate from said first and towards said second position and provides an output signal representative of said movement of said mounting assembly plate.

* * * * *